United States Patent
Gandiga (10) Patent No.: US 11,704,533 B2
(45) Date of Patent: Jul. 18, 2023

(54) ALWAYS LISTENING AND ACTIVE VOICE ASSISTANT AND VEHICLE OPERATION

(71) Applicant: FORD GLOBAL TECHNOLOGIES, LLC, Dearborn, MI (US)

(72) Inventor: Sandeep Raj Gandiga, Santa Clara, CA (US)

(73) Assignee: Ford Global Technologies, LLC, Dearborn, MI (US)

(*) Notice: Subject to any disclaimer, the term of this patent is extended or adjusted under 35 U.S.C. 154(b) by 1248 days.

(21) Appl. No.: 15/987,175

(22) Filed: May 23, 2018

(65) Prior Publication Data

US 2019/0362217 A1  Nov. 28, 2019

(51) Int. Cl.
| | |
|---|---|
| *G06F 3/048* | (2013.01) |
| *G06N 3/006* | (2023.01) |
| *G10L 15/22* | (2006.01) |
| *G10L 15/18* | (2013.01) |
| *G06N 20/00* | (2019.01) |
| *G06F 40/211* | (2020.01) |
| *G10L 15/30* | (2013.01) |

(52) U.S. Cl.
CPC ........... *G06N 3/006* (2013.01); *G06F 40/211* (2020.01); *G06N 20/00* (2019.01); *G10L 15/1815* (2013.01); *G10L 15/22* (2013.01); *G10L 15/30* (2013.01); *G10L 2015/223* (2013.01); *G10L 2015/228* (2013.01)

(58) Field of Classification Search
None
See application file for complete search history.

(56) References Cited

U.S. PATENT DOCUMENTS

| | | | |
|---|---|---|---|
| 8,009,025 B2 * | 8/2011 | Engstrom | G01C 21/26 701/1 |
| 9,104,537 B1 * | 8/2015 | Penilla | G06Q 10/20 |
| 9,250,856 B2 * | 2/2016 | Danne | G06F 3/167 |
| 9,396,727 B2 * | 7/2016 | Tzirkel-Hancock | G10L 15/22 |
| 9,728,188 B1 * | 8/2017 | Rosen | G10L 25/51 |
| 9,798,799 B2 * | 10/2017 | Wolverton | G10L 15/22 |
| 9,875,583 B2 * | 1/2018 | Prokhorov | G07C 5/0816 |
| 9,966,065 B2 * | 5/2018 | Gruber | H04M 3/4936 |
| 10,102,844 B1 * | 10/2018 | Mois | G06F 16/3329 |
| 10,262,652 B2 | 4/2019 | Pfalzgraf et al. | |
| 10,332,513 B1 * | 6/2019 | D'Souza | G10L 15/183 |
| 10,366,107 B2 | 7/2019 | McCloskey et al. | |
| 10,424,296 B2 | 9/2019 | Penilla et al. | |
| 10,489,393 B1 * | 11/2019 | Mittal | G06F 16/2455 |
| 10,515,625 B1 * | 12/2019 | Metallinou | G10L 15/197 |
| 10,706,846 B1 * | 7/2020 | Barton | G10L 15/063 |

(Continued)

FOREIGN PATENT DOCUMENTS

CN  104363331 A  2/2015

*Primary Examiner* — Hua Lu
(74) *Attorney, Agent, or Firm* — Joseph Zane; Brooks Kushman P.C.

(57) ABSTRACT

A vehicle includes a controller configured to select one of a group of topics for generating an answer to a question embedded within the group based on an operating parameter of the vehicle and a syntax of a phrase. The selection is responsive to input originating from utterances including a preceding topic and a following topic having a moniker therebetween that is associated with only one of the topics through the syntax. The vehicle may operate an interface to output the answer.

11 Claims, 4 Drawing Sheets

(56) References Cited

U.S. PATENT DOCUMENTS

| | | | |
|---|---|---|---|
| 10,733,987 B1* | 8/2020 | Govender | G10L 17/06 |
| 10,762,903 B1* | 9/2020 | Kahan | G10L 15/26 |
| 10,789,948 B1* | 9/2020 | Klein | G06F 16/3329 |
| 10,819,667 B2* | 10/2020 | Dahir | G06F 40/10 |
| 10,847,149 B1* | 11/2020 | Mok | G10L 15/22 |
| 10,978,061 B2 | 4/2021 | Boss et al. | |
| 2002/0010604 A1* | 1/2002 | Block | G06Q 10/025 |
| | | | 705/6 |
| 2010/0088254 A1* | 4/2010 | Yang | G06N 20/00 |
| | | | 706/11 |
| 2010/0198590 A1* | 8/2010 | Tackin | H04L 12/6418 |
| | | | 704/214 |
| 2013/0185066 A1* | 7/2013 | Tzirkel-Hancock | |
| | | | G10L 21/003 |
| | | | 381/71.4 |
| 2014/0136187 A1* | 5/2014 | Wolverton | G10L 15/22 |
| | | | 704/9 |
| 2014/0195663 A1 | 7/2014 | Hirschenberger et al. | |
| 2015/0046418 A1* | 2/2015 | Akbacak | G06F 16/907 |
| | | | 707/706 |
| 2015/0046518 A1 | 2/2015 | Cao | |
| 2015/0348551 A1* | 12/2015 | Gruber | G10L 15/1822 |
| | | | 704/235 |
| 2016/0159345 A1* | 6/2016 | Kim | B60W 50/12 |
| | | | 701/36 |
| 2016/0232221 A1* | 8/2016 | McCloskey | G06N 5/04 |
| 2016/0232890 A1* | 8/2016 | Pfalzgraf | G10L 15/1815 |
| 2017/0011742 A1* | 1/2017 | Jing | G10L 15/22 |
| 2017/0068423 A1* | 3/2017 | Napolitano | G06F 16/489 |
| 2017/0109947 A1* | 4/2017 | Prokhorov | G10L 15/22 |
| 2017/0140757 A1* | 5/2017 | Penilla | G01C 21/3641 |
| 2017/0162205 A1* | 6/2017 | Melvin | G10L 25/78 |
| 2017/0262537 A1 | 9/2017 | Harrison et al. | |
| 2018/0061409 A1* | 3/2018 | Valentine | G10L 15/22 |
| 2018/0096681 A1* | 4/2018 | Ni | G10L 15/1822 |
| 2018/0182380 A1* | 6/2018 | Fritz | H04M 7/0042 |
| 2018/0232645 A1* | 8/2018 | Finkelstein | G06F 18/251 |
| 2018/0350365 A1* | 12/2018 | Lee | G10L 15/22 |
| 2019/0146491 A1* | 5/2019 | Hu | G06F 3/017 |
| | | | 701/27 |
| 2019/0180740 A1* | 6/2019 | Nandy | G10L 15/30 |
| 2019/0237067 A1* | 8/2019 | Friedman | H04R 1/406 |
| 2019/0279624 A1* | 9/2019 | Boss | G06F 40/20 |

* cited by examiner

ALWAYS LISTENING AND ACTIVE VOICE ASSISTANT AND VEHICLE OPERATION

TECHNICAL FIELD

This disclosure relates to the operation of vehicles through active and always listening voice assistance.

BACKGROUND

Query systems give answers to questions asked after invocation. For example, "Hey Ford®, what is the weather like today?" After the invocation, "Hey Ford®," natural language processing and artificial methods are used to find an answer to the question. This cadence—where invocation is required prior to the question—may require more statements than necessary to provide the answer because conversations prior to invocation are ignored. Additionally, query systems that provide reverse cadence support may be ill-equipped to distinguish between forward cadences and reverse cadences.

SUMMARY

A vehicle includes a controller configured to select one of a group of topics for generating an answer to a question embedded within the group based on an operating parameter of the vehicle and a syntax of a phrase. The selection is responsive to input originating from utterances including a preceding topic and a following topic having a moniker therebetween that is associated with only one of the topics through the syntax. The vehicle may operate an interface to output the answer.

A vehicle includes a controller configured to select one of a group of topics for generating an answer to a question embedded within the group based on an operating parameter of the vehicle and a syntax of a phrase. The selection is responsive to input originating from utterances including a preceding topic and a following topic having a moniker therebetween that is associated with only one of the topics through the syntax. The vehicle may be operated according to the answer.

A method includes, by a controller, generating an answer to a question embedded within a group of topics based on a selection of one of the topics and an operating parameter of the vehicle and a syntax, and operate the vehicle according to the answer. The generation is responsive to input originating from utterances defining a group of phrases including a preceding topic and a following topic having a moniker therebetween associated with only one of the topics through syntax.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicle occupants carry conversations discussing events, circumstances, or issues of the past, present, and future. Instead of requiring forward-biased invocation similar to, "Hey Ford®, what is the temperature outside," an algorithm may be implemented to distinguish between forward and reverse cadences. Indeed, a vehicle query system may provide answers and solutions related to a vehicle based on a combination of forward cadences, reverse cadences, vehicle operating parameters, and/or always-listening algorithms. Questions using a reverse cadence may include a tag question or a tag question phrase. The tag question phrase may be isolated to identify the reverse cadence. The tag question phrase would generally follow topics that require the answering service (i.e., a reverse cadence), while other interrogatories would generally precede topics that require the answering service (i.e., a forward cadence). Verbal utterances may be recorded and analyzed constantly to isolate topics and provide contexts. As the topics of potential questions are organized, the algorithm waits for an invocation such as, "Ford®, what do you think." A tag question is any question that follows a statement as opposed to preceding a statement. A tag question phrase may include a moniker of whom the question is being asked. The always listening and tag question answering service provides a reverse cadence where the statement is made, the service is invocated, and then the answer is provided. The always listening and tag question answering service provides a forward cadence the service is invocated, where the statement is made, and then the answer is provided. The always listening service may also always search for answers to every topic so that the answer is readily available for presentation to the occupant.

An inherent problem with providing forward and reverse answering services is that a conversation may include multiple answerable topics, and the occupants desired answer topic is not particularly clear. An example conversation is provided below:

Suzy says, "The Detroit symphony orchestra is playing tonight in Detroit." "Ford®, what do you think?" "I bet we have enough fuel to get to Detroit but it is going to be very cold." (Reverse Cadence)

Suzy says, "The Detroit symphony orchestra is playing tonight in Detroit." "Hey Ford®, I bet we have enough fuel to get to Detroit but it is going to be very cold." (Forward Cadence)

The previous conversation included at least three topics 1) the Detroit symphony orchestra is playing tonight in Detroit; 2) I bet we have enough fuel to get to Detroit; and 3) it is going to be very cold. The topics may be isolated based on syntactical, categorical, or other methods. Over time, the topics may be distilled and isolated to particular contexts. The contexts may be broad categories of topics of which answers may be required. The contexts may also be presented to vehicle occupants for selection. The selection may also be provided via machine learning such that topics are selected according to previously selected topics. Meaning, the occupant may select the topic selection made, and then the machine learning algorithm would update the preferred contexts automatically. After the topic is selected based on the context, the vehicle may provide an answer or indication to the occupant by operation of the vehicle or display of the answer. Indeed, an always listening algorithm may be used to identify topics requiring answer service and automatically provide an answer to the topic after invocation by a tag question phrase.

Figure 1:
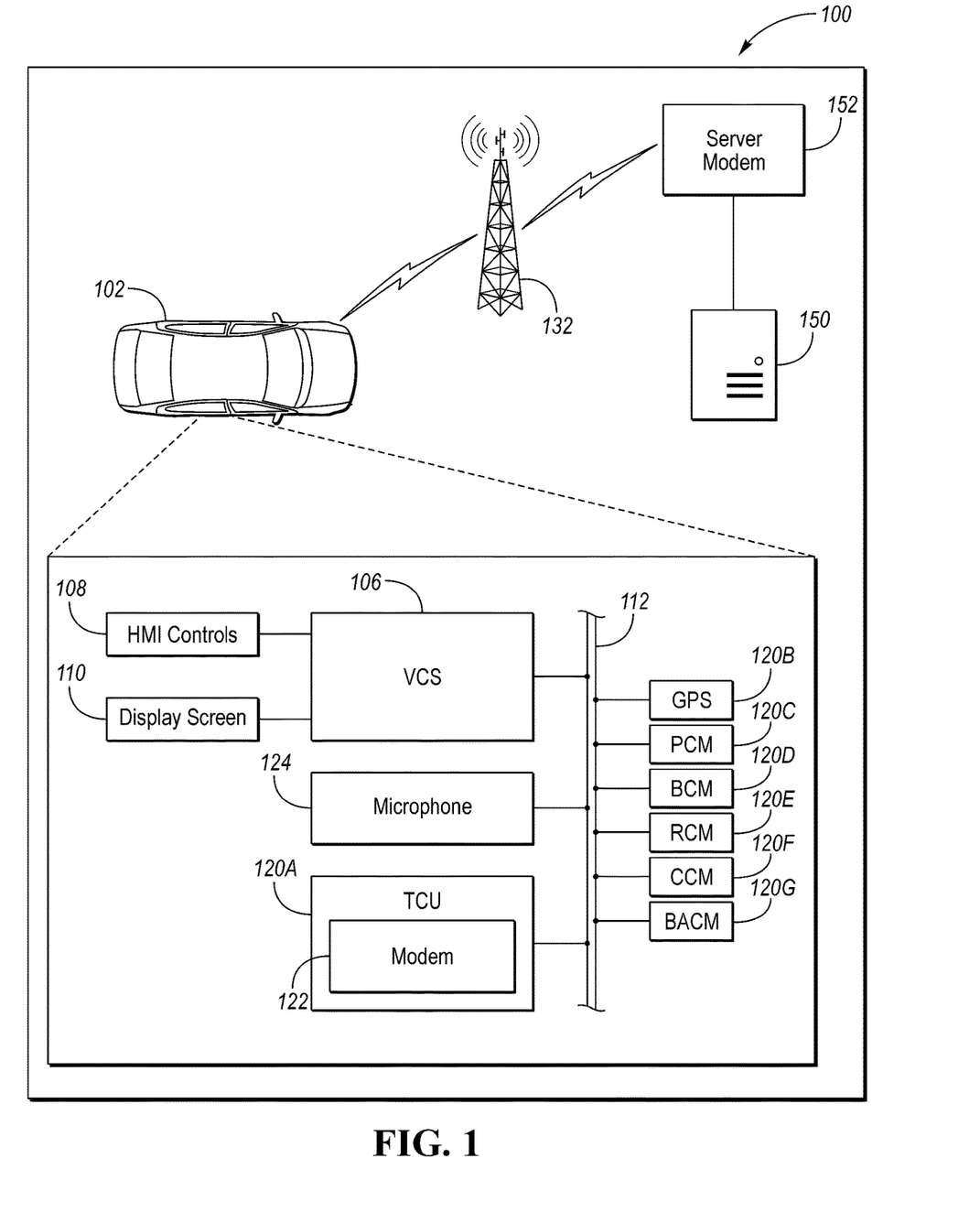
FIG. 1 is a schematic of a vehicle having an infotainment system and associated communications capabilities.

FIG. 1 illustrates an example system 100 including a vehicle 102 implementing an always listening answer retrieval algorithm. The vehicle 102 may include a vehicle computing system (VCS) 106 configured to communicate over a wide-area network using a telematics control unit (TCU) 120A. The TCU 120A may have various modems 122 configured to communicate over respective communications paths and protocols. While an example system 100 is shown in FIG. 1, the example components as illustrated are not intended to be limiting. Indeed, the system 100 may have more or fewer components, and additional or alternative components and/or implementations may be used.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The VCS 106 may be configured to support voice command and BLUETOOTH interfaces with the driver and driver carry-on devices, receive user input via various buttons or other controls, and provide vehicle status information to a driver or other vehicle 102 occupants. An example VCS 106 may be the SYNC® system provided by FORD MOTOR COMPANY of Dearborn, Mich.

The VCS 106 may further include various types of computing apparatus in support of performance of the functions of the VCS 106 described herein. In an example, the VCS 106 may include one or more processors configured to execute computer instructions, and a storage medium on which the computer-executable instructions and/or data may be maintained. A computer-readable storage medium (also referred to as a processor-readable medium or storage) includes any non-transitory (e.g., tangible) medium that participates in providing data (e.g., instructions) that may be read by a computer (e.g., by the processor(s)). In general, a processor receives instructions and/or data, e.g., from the storage, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, Java Script, Perl, PL/SQL, etc.

The VCS 106 may be configured to communicate with TCU 120A. The TCU 120A may include a plurality of modems 122 capable of packet-switch or circuit-switched signaling. The TCU 120A may control the operation of the modems 122 such that a suitable communication path is used. The modems may be configured to communicate over a variety of communications paths. The paths may be configured with circuit-switched 130, packet-switched 132, 134 signaling, or combination thereof. Packet-switched communication 132, 134 paths may be Internet Protocol (IP)-based or use packet-based switching to transfer information. For example, the packet-switched communication may be long-term evolution (LTE) communications. In some circumstances the circuit-switch 130 communication path may be SIGTRAN or another implement, carrying circuit-switched signaling information over IP. The underlying signaling information is, however, still formatted under the circuit-switched protocol.

The VCS 106 may also receive input from human-machine interface (HMI) controls 108 configured to provide for occupant interaction with the vehicle 102. For instance, the VCS 106 may interface with one or more buttons or other HMI controls 108 configured to invoke functions on the VCS 106 (e.g., steering wheel audio buttons, a push-to-talk button, instrument panel controls, etc.). The VCS 106 may also drive or otherwise communicate with one or more displays 110 configured to provide visual output to vehicle occupants, e.g., by way of a video controller. In some cases, the display 110 may be a touch screen further configured to receive user touch input via the video controller, while in other cases the display 110 may be a display only, without touch input capabilities. In an example, the display 110 may be a head unit display included in a center console area of the vehicle 102 cabin. In another example, the display 110 may be a screen of a gauge cluster of the vehicle 102.

The VCS 106 may be further configured to communicate with other components of the vehicle 102 via one or more in-vehicle networks 112 or vehicle buses 112. The in-vehicle networks 112 may include one or more of a vehicle controller area network (CAN), an Ethernet network, and a media oriented system transfer (MOST), as some examples. The in-vehicle networks 112 may allow the VCS 106 to communicate with other vehicle 102 systems, such as a vehicle modem of the TCU 120A (which may not be present in some configurations), a global positioning system (GPS) module 120B configured to provide current vehicle 102 location and heading information, and various other vehicle ECUs configured to cooperate with the VCS 106. As some non-limiting possibilities, the vehicle ECUs may include a powertrain control module (PCM) 120C configured to provide control of engine operating components (e.g., idle control components, fuel delivery components, emissions control components, etc.) and monitoring of engine operating components (e.g., status of engine diagnostic codes); a body control module (BCM) 120D configured to manage various power control functions such as exterior lighting, interior lighting, keyless entry, remote start, and point of access status verification (e.g., closure status of the hood, doors and/or trunk of the vehicle 102); a radio transceiver module (RCM) 120E configured to communicate with key fobs or other local vehicle 102 devices; a climate control management (CCM) 120F module configured to provide control and monitoring of heating and cooling system components (e.g., compressor clutch and blower fan control, temperature sensor information, etc.); and a battery control module (BACM) 120G configured to monitor the state of charge or other parameters of the battery 104 of the vehicle 102.

In an example, the VCS 106 may be configured to access the communications features of the TCU 120A by communicating with the TCU 120A over a vehicle bus 112. As some examples, the vehicle bus 112 may include a controller area network (CAN) bus, an Ethernet bus, or a MOST bus. In other examples, the VCS 106 may communicate with the server 150 via a server modem 152 using the communications services of the modems 122.

Figure 2:
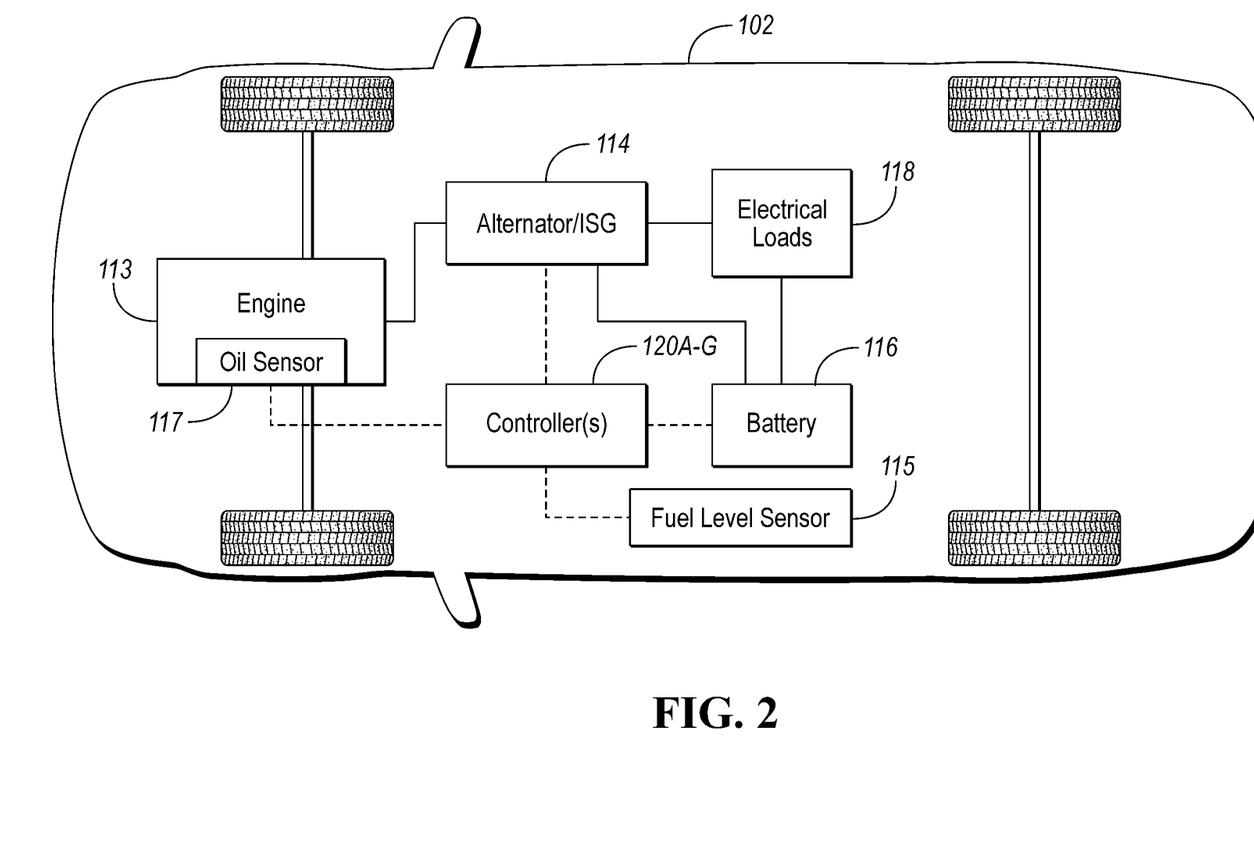
FIG. 2 is a schematic of vehicle control systems and peripherals.

Referring to FIG. 2, the vehicle 102 may include an engine 113, starter-generator 114, battery 116, and electrical loads 118. The controller network 112 may connect to all of these vehicle systems through sensors (e.g., fuel level sensor 115, oil sensor 117) or vehicle system controllers (e.g., 120A, 120B, 120C, 120D, 120E, 120F, 120G). For example, the controller network 112 may control the vehicle systems to provide autonomous control. The engine 113 may have a direct mechanical linkage to the starter-generator 114. The starter-generator 114 may be electrically connected to the battery 116 and electrical loads 118. The battery 116 may be connected to the electrical loads 118. In response to overhearing the conversation mentioned above, the VCS 106 may recognize that the vehicle occupants desire to travel to Detroit if they have enough gas. The VCS 106 may pull data from vehicle sensors (i.e., fuel level sensor 115) to determine the remaining fuel in the fuel tank. The VCS 106 may then request the anticipated fuel consumption for the vehicle's 102 current location to the symphony orchestra. Indeed, the vehicle 102 can listen to the occupants' conversation and upon request provide a response without further requiring the question to be re-asked or the provision of additional information.

Figure 3A:
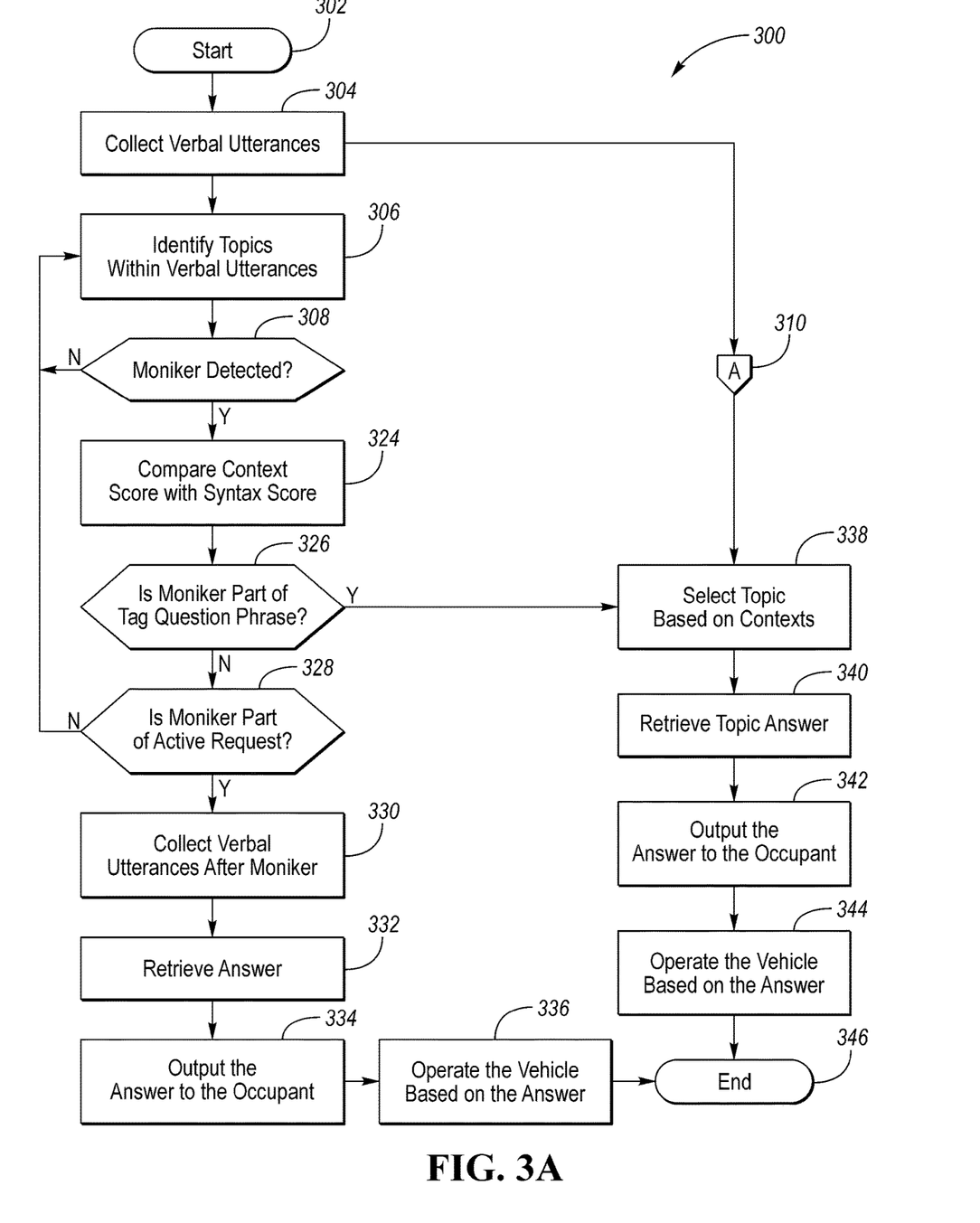
FIG. 3A is an algorithm always listening voice systems.
Figure 3B:
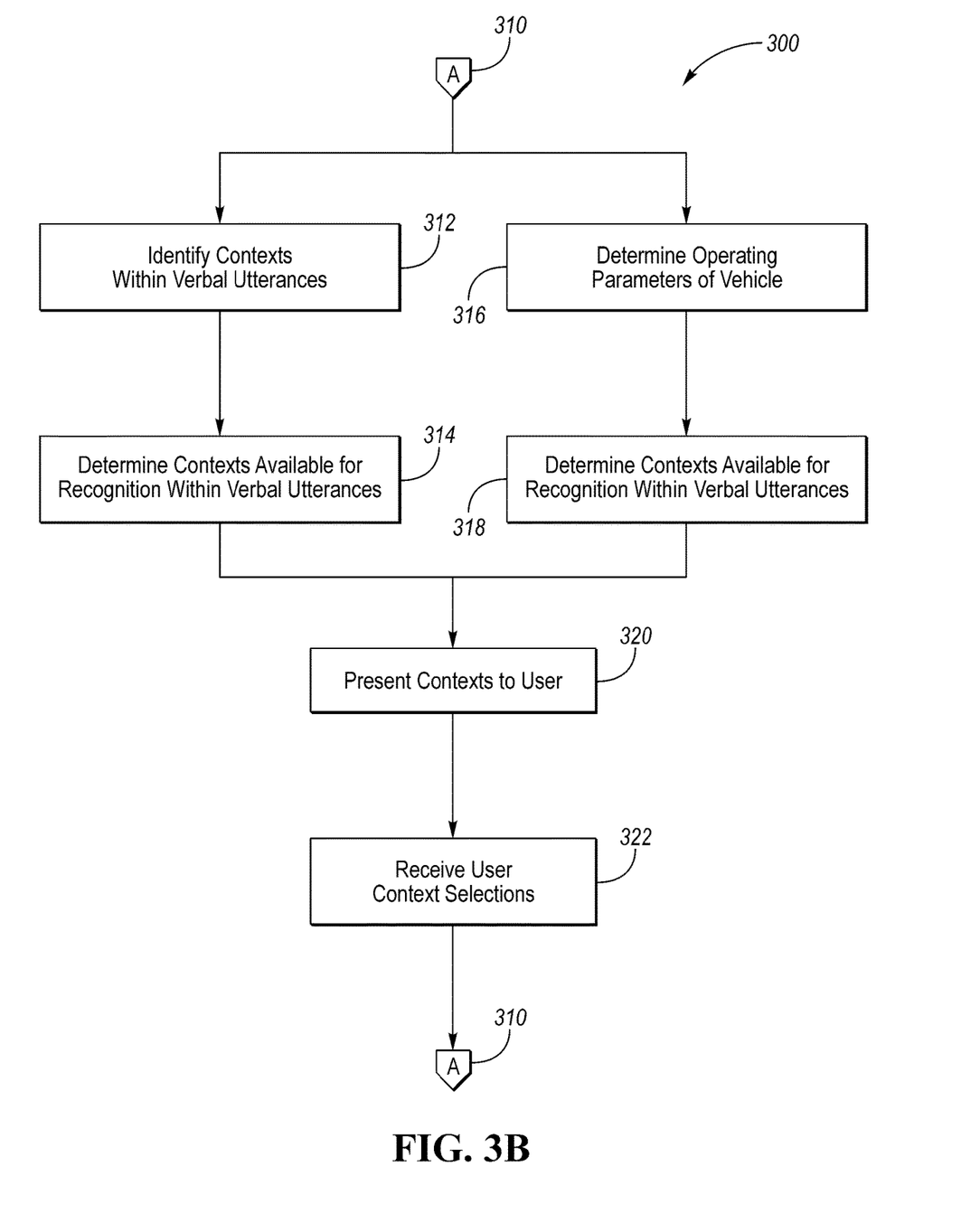
FIG. 3B is an algorithm for selecting contexts.

Referring to FIGS. 3A-B, an algorithm 300 is shown. The algorithm 300 starts in step 302. An implementation of the algorithm 300 may include additional or less steps, and the steps may be performed in a different order. The steps may also be performed simultaneously, at similar times, or sequentially. In step 304, the VCS 106 or other processors collect verbal utterances. The verbal utterances may be sayings, statements, uttered words, or conversations available for capture by the microphone or array of microphones 124 by occupants in or near the vehicle. In step 306, topics are identified within the verbal utterances. The topics may be identified based on any natural language processing algorithm. Any part of speech may be used—or combination thereof—to determine the topics (e.g., nouns, verbs). The topics are identified to later be associated with the question asked. The topics may be portions of a sentence or entire sentences. The topics may be formed by verb-noun associations or other grammatical, syntactical, or semantical associations.

In step 308, the VCS 106 waits for recognition of a moniker. A moniker may be any word or saying associated with the vehicle (e.g., manufacturer, model, software provider, infotainment system provider, branding associated with the vehicle or vehicle manufacturer). The moniker may be part of a tag question phrase or a tag question.

In step 324, a context score is compared with a syntax score. The context score may be based on the topic score of identified topics in step 306. Meaning, the confidence that a given statement, phrase, or word is associated with a particular topic and context may be determined based on a variety of natural language and machine learning methods. For example, the statement "the Detroit symphony orchestra is playing tonight in Detroit" includes two topics. One topic in the statement may be the Detroit symphony orchestra. A second topic may be the city of Detroit. The context of the statement may be musical performance events. Because the statement is directly associated with the context, the context confidence score may be labeled as high, qualitatively, or above 75, quantitatively. Similarly, the statement "the Detroit art gallery is hosting an exposé tonight in Detroit" includes two similar topics that may have some relation to the musical performance events context. The context score in this situation may be markedly lower because the topic is not specifically musical performance, instead it is related to artistic performances. Therefore, the context confidence score may be labeled as medium, qualitatively, or above 50, quantitatively. The highest context score may be compared with the syntax score.

The syntax score may determine, syntactically, whether a tag question phrase exists and the moniker is part of the tag question phrase. For example, the tag question phrase may simply be, "Ford®?" Although Ford® comes at the end of a statement as a tag question phrase—indicating a reverse cadence—it could also be the beginning of a forward cadence. The algorithm may determine whether the moniker Ford® is syntactically at the beginning or end of a question using known and unknown methods. The confidence score of whether a forward or reverse cadence is being used may be labeled qualitatively or quantitatively as described above. A phrase with the highest syntax score may be, "(topic). What do you think, Ford®?" While a phrase with a low score may be, "Hey Ford®, (topic)." This is because a reverse cadence could almost never be associated with "Hey Ford®" preceding the topic, and a phrase like "What do you think, Ford®" leaves ambiguity as to whether the topic precedes or follows the phrase. Therefore, the syntax score is a representation of whether the cadence is forward or reverse.

In step 326 and step 328, non-interrogatory moniker utterances are filtered to prevent unintentional requests. If the moniker is not part of a tag question phrase (e.g., reverse cadence) or an active request (e.g., forward cadence), the algorithm returns to step 306. If the moniker is part of a tag question phrase according to a syntactical confidence score being above a predetermined threshold—or above a threshold set relative to the context score—the algorithm proceeds to step 338. If the moniker is not part of a tag question phrase according to a syntactical confidence score being above a predetermined threshold—or above a threshold set relative to the context score—the algorithm proceeds to step 328.

After a tag question phrase is detected in step 326, the algorithm will select an already captured topic from the verbal utterances based on contexts, as defined in sub-algorithm A 310. Sub-algorithm A 310 collects information to define contexts. Contexts may be categories of topics or other logical representations configured to represent classes of vehicle operating parameters. As shown in step 312, sub-algorithm A 310 identifies contexts within verbal utterances. Context identification may include nutrition information generally, while topic identification is more narrowly tuned to a question about nutrition in a candy bar. The list of contexts (e.g., nutrition, distance to destination, points of interest, weather) may be narrowly tuned for the vehicle in step 314 such that generic information requests are not available (e.g., answers to arithmetic, pronunciation of words). Meaning, broad question retrieval abilities may optionally be narrowed by the manufacturer or occupant under the assumption that vehicle or travel related questions will be present.

Similarly, in step 316, vehicle operating parameters are analyzed to provide contexts. For example, the vehicle may be configured to make vehicle-specific parameter contexts available for the question-answer service. Meaning, contexts associated with oil life, fuel level, state of charge, climate status, engine temperature, or other vehicle parameters may be made available through contexts in step 316. A machine algorithm or manufacturer may select the operating parameters available for answer retrieval, in step 318. For example, oil temperature may be an available vehicle parameter, but a machine learning algorithm may determine that the context should not be made available because questions are so infrequently asked about engine oil temperature. Vehicle parameter contexts may be given a stronger weight that the verbal utterance contexts.

In step 320 the contexts are presented to the user. Meaning, the user can further select which contexts it may desire to have answered by the answer service. The contexts may be presented using the HMI controls 108 or the display screen 110. The contexts may be read by the system to the occupants and the occupants may provide confirmation of the proper context selection. For example, the vehicle may state, "Line 1: Weather." The occupant may then verbally affirm that line one is the proper selection by saying, "One." The contexts may be presented such that the most commonly used contexts are presented first. The contexts may also be presented in an order based on the verbal utterances already received and the frequency of the contexts being discussed. For example, if the weather in Detroit is a topic discussed along a road trip, the weather context may be presented to the user as a primary option. In step 322 the user context selections are received for use in step 338. The contexts may be assigned weights to improve the answer service. For example, the heavily discussed weather context may be given a stronger weight than the sparsely discussed oil temperature. All other things being equal, the heavier weighted context will take topic selection precedence over the unweighted or less-weighted context in the topic selection process of step 338.

In step 338, the selected contexts along with the identified topics are known. The algorithm may then recognize the topic to be determined based on the contexts. The topic selection may take into account the weights applied to the contexts that each topic resides in. For example, topics within the weather context may take precedence over the topics in the oil temperature context. Further, the topics syntactical and semantical strength may be weighted. For example, a confidence value of the topic may be determined based on the condition of the verbal utterance. Meaning, phrases that have grammatical coherence may fall within a stronger weighted context but be discounted because of the syntactical or semantical score. Additionally, proximity to the tag question phrase may be used to further weight the topic. For example, topics falling directly before the tag question phrase may have its score doubled or multiplied by a factor. Meaning, a context having a low weight may be selected over a context having a high weight if the topic immediately precedes the tag question phrase and the syntactical and semantical scores are low for the weather topic.

In step 340, the selected topic having the highest confidence score is sent to the server 150 to be answered. The server 150 provides the highest likely answer through the statistical and machine learning algorithms therein. Any answering service may provide the answer, and the answer does not need to be relative a vehicle. The answer may be sent back to the vehicle and presented to the occupants in step 342. The vehicle 102 may then automatically operate the vehicle based on the answer or prompt the user select a course of action in step 344. For example, if the topic selected was "I bet we have enough fuel to get to Detroit" the vehicle may prepare a route to Detroit for the symphony and autonomously navigate the car to the destination.

In step 328, the VCS 106 determines whether the moniker is part of a forward cadence. The forward cadence determination may be based on the comparison of context and syntactic scores. For example, the syntactical score may be high when the moniker is accompanied by a salutation (e.g., "Hey Ford®"). If the moniker is associated with a forward cadence in step 328, the VCS 106 will discard all utterances before invocation and store any utterances after invocation in step 330. In step 332, the VCS 106 sends the query request determined from the stored verbal utterances to the server 150. The server 150 provides the highest likely answer through the statistical and machine learning algorithms therein. Any answering service may provide the answer, and the answer does not need to be relative a vehicle. The answer may be sent back to the vehicle and presented to the occupants in step 334. The vehicle 102 may then automatically operate the vehicle based on the answer or prompt the user select a course of action in step 336. For example, statement was, "Hey Ford®, do we have enough fuel to get to Detroit," the vehicle may prepare a route to Detroit for the symphony and autonomously navigate the car to the destination upon an affirmative answer.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. For example, an always listening algorithm may be used to identify topics requiring answer service and automatically provide an answer to the topic, which may not be based on an operating parameter of the vehicle. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
a processor configured to:
receive audible input from vehicle occupants;
determine that the audible input includes a key phrase;
responsive to determining that the audible input includes the key phrase, parse the audible input for potential query contexts and potential query topics based on syntax predefined as being associated with queries, the contexts being categories associable with the audible input and the topics being an element of at least one category;
present one or more identified potential query contexts on a vehicle interface;

determine a syntax score for each potential query topic based on the syntax, wherein topics having a forward speaking cadence leading into the key phrase have a higher syntax score than topics having a reverse speaking cadence trailing the key phrase;
responsive to selection of a presented context, weight the topics based on a correlation to the selected context;
adjust the weight of the topics based on the syntax score;
automatically select one of the topics, based on the weightings associated with the topics as adjusted by the syntax score;
determine a question related to the selected topic embedded within the group based on syntax of the audible input; and
operate an interface to output the answer.

2. The vehicle of claim 1, wherein contexts are generated based on statements made while an answering algorithm is uninvoked.

3. The vehicle of claim 2, wherein the topics are determined based on the contexts prior to presentation of the contexts.

4. The vehicle of claim 1, wherein the presented contexts are ordered based on a determined relevancy.

5. The vehicle of claim 4, wherein the determined relevancy is based at least in part on prior discussion of the context, based on prior audible input, during at least a present journey.

6. The vehicle of claim 4, wherein the determined relevancy is based at least in part on predetermined general commonality of usage associated with each context.

7. The vehicle of claim 1, wherein the vehicle is further configured to automatically navigate to a location responsive to the selected topic correlates to language defined as indicating a desire to navigate to the location.

8. The vehicle of claim 1, wherein the selected topic includes a question about sufficiency of a resource usable to reach the location and wherein the automatic navigation is further responsive to automatically determining that sufficient resource remains to reach the location.

9. The vehicle of claim 1, wherein the key phrase is a manufacturer of the vehicle.

10. A vehicle comprising:
a processor configured to:
receive audible input from vehicle occupants;
determine that the audible input includes a key phrase;
responsive to determining that the audible input includes the key phrase, parse the audible input for potential query contexts and potential query topics based on syntax predefined as being associated with queries, the contexts being categories associable with the audible input and the topics being an element of at least one category;
present one or more identified potential query contexts on a vehicle interface;
determine a syntax score for each potential query topic based on the syntax, wherein topics having a forward speaking cadence leading into the key phrase have a higher syntax score than topics having a reverse speaking cadence trailing the key phrase;
responsive to selection of a presented context, weight the topics based on a correlation to the selected context,
adjust the weight of the topics based on the syntax score;
automatically select one of the topics, based on the weightings associated with the topics as adjusted by the syntax score;
determine a question related to the selected topic embedded within the group based on syntax of the audible input; and
automatically navigate to a location responsive to the selected topic correlates to language defined as indicating a desire to navigate to the location.

11. A method comprising:
receiving audible input from vehicle occupants;
determining that the audible input includes a key phrase;
responsive to determining that the audible input includes the key phrase, parsing the audible input for potential query contexts and potential query topics based on syntax predefined as being associated with queries, the contexts being categories associable with the audible input and the topics being an element of at least one category;
presenting one or more identified potential query contexts on a vehicle interface;
determining a syntax score for each potential query topic based on the syntax, wherein topics having a forward speaking cadence leading into the key phrase have a higher syntax score than topics having a reverse speaking cadence trailing the key phrase;
responsive to selection of a presented context, weighting the topics based on a correlation to the selected context,
adjusting the weight of the topics based on the syntax score;
automatically selecting one of the topics, based on the weightings associated with the topics as adjusted by the syntax score;
determining a question related to the selected topic embedded within the group based on syntax of the audible input; and
automatically navigating to a location responsive to the selected topic correlates to language defined as indicating a desire to navigate to the location.

* * * * *